(12) United States Patent
Misawa et al.

(10) Patent No.: US 6,550,946 B2
(45) Date of Patent: Apr. 22, 2003

(54) INSIDE HANDLE ILLUMINATOR

(75) Inventors: Akihiro Misawa, Aichi (JP); Hiroshi Ito, Aichi (JP); Hisatoshi Ota, Aichi (JP); Kazushi Noda, Aichi (JP); Akihiro Honma, Aichi (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 09/745,431

(22) Filed: Dec. 26, 2000

(65) Prior Publication Data

US 2001/0006465 A1 Jul. 5, 2001

(30) Foreign Application Priority Data

Dec. 24, 1999 (JP) .......................................... P11-368177

(51) Int. Cl.$^7$ ................................................ B60Q 3/06
(52) U.S. Cl. ........................ 362/501; 362/26; 362/100; 362/540
(58) Field of Search ................................. 362/100, 501, 362/26, 116, 459, 487, 540; 296/76; 292/347, 336.3

(56) References Cited

U.S. PATENT DOCUMENTS

| | | | |
|---|---|---|---|
| 5,575,553 A | * 11/1996 | Tipton | 362/101 |
| 6,086,131 A | * 7/2000 | Bingle et al. | 292/336.3 |
| 6,213,616 B1 | * 4/2001 | Chien | 42/77 |

FOREIGN PATENT DOCUMENTS

JP    11 105547    4/1999

* cited by examiner

Primary Examiner—Sandra O'Shea
Assistant Examiner—John Anthony Ward
(74) Attorney, Agent, or Firm—McGinn & Gibb, PLLC

(57) ABSTRACT

A lamp unit provided with an LED light source is attached to the back surface of an inside handle vessel, and the position of the light source is fixed. Then, the inside handle vessel together with the lamp unit is installed in a door trim.

11 Claims, 5 Drawing Sheets

INSIDE HANDLE ILLUMINATOR

BACKGROUND OF THE INVENTION

1. Field of the Invention

The present invention relates to a vehicle-interior illuminator, and particularly relates to an improvement of a method of attaching a light source in an illuminator for illuminating an inside handle portion.

The present application is based on Japanese Patent Application No. Hei. 11-368177, which is incorporated herein by reference.

2. Description of the Related Art

An illuminator intended to improve the visibility of an inside handle portion is known as a vehicle-interior illuminator. For example, in an illuminator disclosed in JP-A-11-105547, a light source is disposed on a support plate provided at the rear of an inside handle vessel, so that light from the light source is taken out to a front surface of the inside handle vessel through a gap (window) between the inside handle vessel and an inside handle so as to illuminate the inside handle portion. In the work of assembling such an illuminator, the light source is first attached to the support plate, and the inside handle vessel and the inside handle are thereafter installed.

In the aforementioned background-art illuminator, the position of the light source and the position of the window for taking out light from the light source are adjusted when the inside handle vessel and the inside handle are installed. To say other words, it is necessary to install the inside handle and so on while the position of the light source, the position of the inside handle, and so on, are adjusted finely. In addition, it is necessary to design individual parts in consideration of the position where the light source is attached and the positions where the inside handle vessel and so on are installed.

On the other hand, in a recent process of assembling a car, modularized parts are used to improve the efficiency of working. That is, modules in which some parts are combined with one another are prepared in advance and set in predetermined positions. Also in the inside handle portion, an inside handle module in which a door trim vessel, an inside handle, and so on, are combined with one another is prepared in advance and installed in a predetermined position of a door trim. Since such modularized parts are increased in size in comparison with individual parts, it becomes more difficult to adjust the installation positions of the modularized parts finely when they are installed.

SUMMARY OF THE INVENTION

The present invention has been developed to solve the foregoing problems. It is therefore an object of the present invention to provide an inside handle portion illuminator in which fine position adjustment is made unnecessary in the work of assembling, so that the efficiency of working can be improved.

In order to attain the foregoing object, according to the present invention, there is provided an inside handle illuminator comprising: an inside handle vessel; a lamp unit having a light source for illuminating an inside handle portion from a back surface side of the inside handle vessel; and fixing means for fixing the lamp unit to the inside handle vessel.

In the illuminator configured thus, a lamp unit having a light source is fixed directly to the inside handle vessel. Accordingly, it is not necessary to install the inside handle vessel and so on in accordance with the position where the light source is attached. That is, it is possible to install the inside handle vessel and so on without performing troublesome position adjustment. As a result, it is possible to improve the efficiency of working. In addition, when modularized parts are used, the efficiency of working is further improved.

The inside handle vessel is a box-like member having an opening portion on the cabin side, and the opening portion forms an inside handle receiving portion.

The lamp unit is attached to the back surface side of the inside handle vessel, that is, on the opposite side to the inside handle receiving portion. Thus, light from the light source provided inside the lamp unit illuminates the inside handle portion from the back surface side of the inside handle vessel. The position where the lamp unit is attached is not limited specially so long as the position is on the back surface side of the inside handle vessel. That is, the inside handle receiving portion can be illuminated from its top, bottom or side in accordance with the position where the lamp unit is attached.

A bulb or an LED may be used as the light source. If the request of miniaturization and power-saving is taken into consideration, it is preferable to use an LED as the light source. A general-purpose LED may be used therefor, and the color of light emitted therefrom may be selected optionally.

The lamp unit is fixed to the inside handle vessel by fixing means. As the fixing means, means for making a part of the lamp unit engage with a part of the inside handle vessel may be adopted. For example, a protrusion provided in the lamp unit is made to engage with a recess provided in the inside handle vessel. That is, one or plural protrusions are provided in the lamp unit so as to be plugged in recesses provided in the inside handle vessel. Thus, the lamp unit is fixed to the inside handle vessel. Of course, protrusions may be provided in the inside handle vessel so as to be plugged in recesses provided in the lamp unit so that the lamp unit can be fixed to the inside handle vessel. Further, protrusions and recesses may be provided in the lamp unit. In this case, recesses and protrusions are provided in the inside handle vessel correspondingly to the protrusions and the recesses of the lamp unit. The number of the protrusions or the recesses provided in the lamp unit or provided in the inside handle vessel is not limited specially.

Here, such protrusions imply ones having various shapes as well as projections. Projections may be further provided on a part of the protrusions. On the other hand, such recesses imply a configuration in which through holes are provided in a part of the inside handle vessel or the lamp unit.

DETAILED DESCRIPTION OF THE PREFERRED EMBODIMENTS

The configuration of the present invention will be described in detail on the basis of an embodiment thereof.

Figure 1:
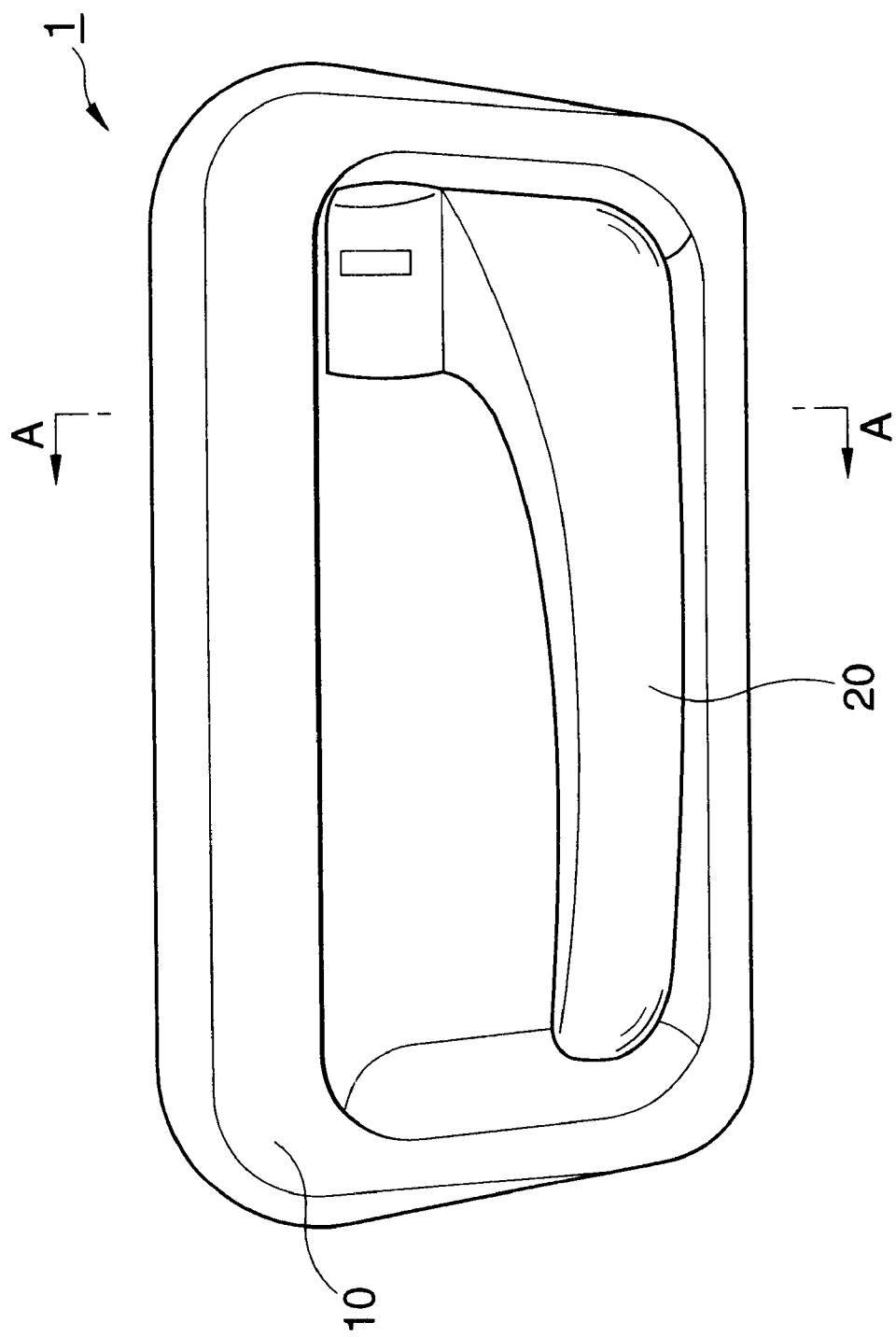
FIG. 1 is a front view of an inside handle portion according to an embodiment of the present invention.
Figure 2:
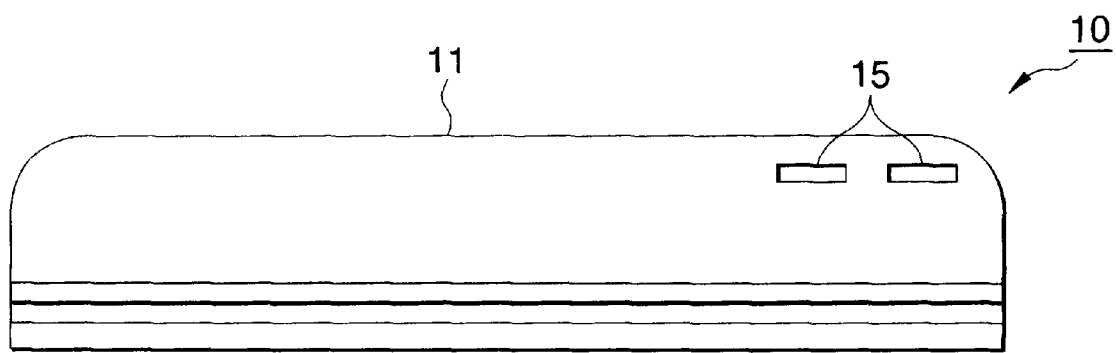
FIG. 2 is a plan view of an inside handle vessel according to the same embodiment.
Figure 3:
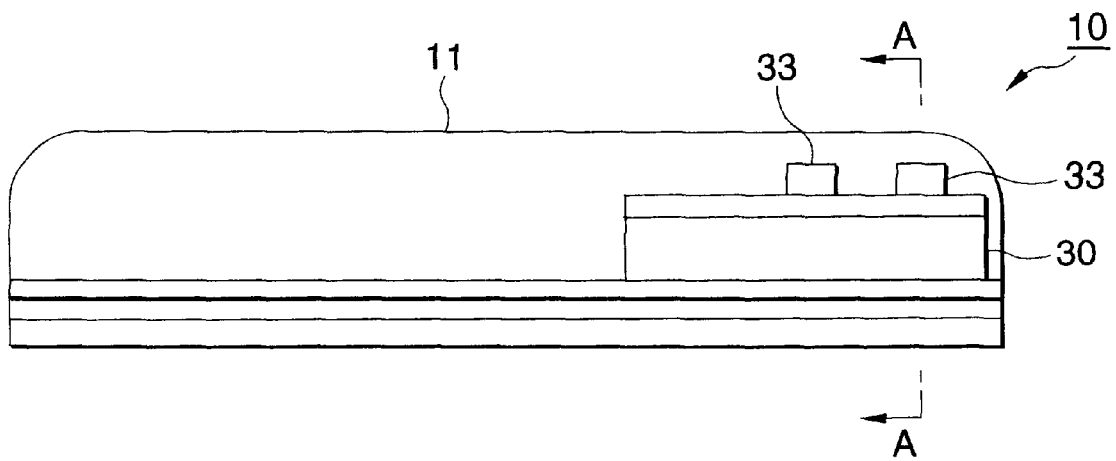
FIG. 3 is a plan view of the inside handle vessel according to the same embodiment, showing the state where a lamp unit has been attached to the inside handle vessel.
Figure 4:
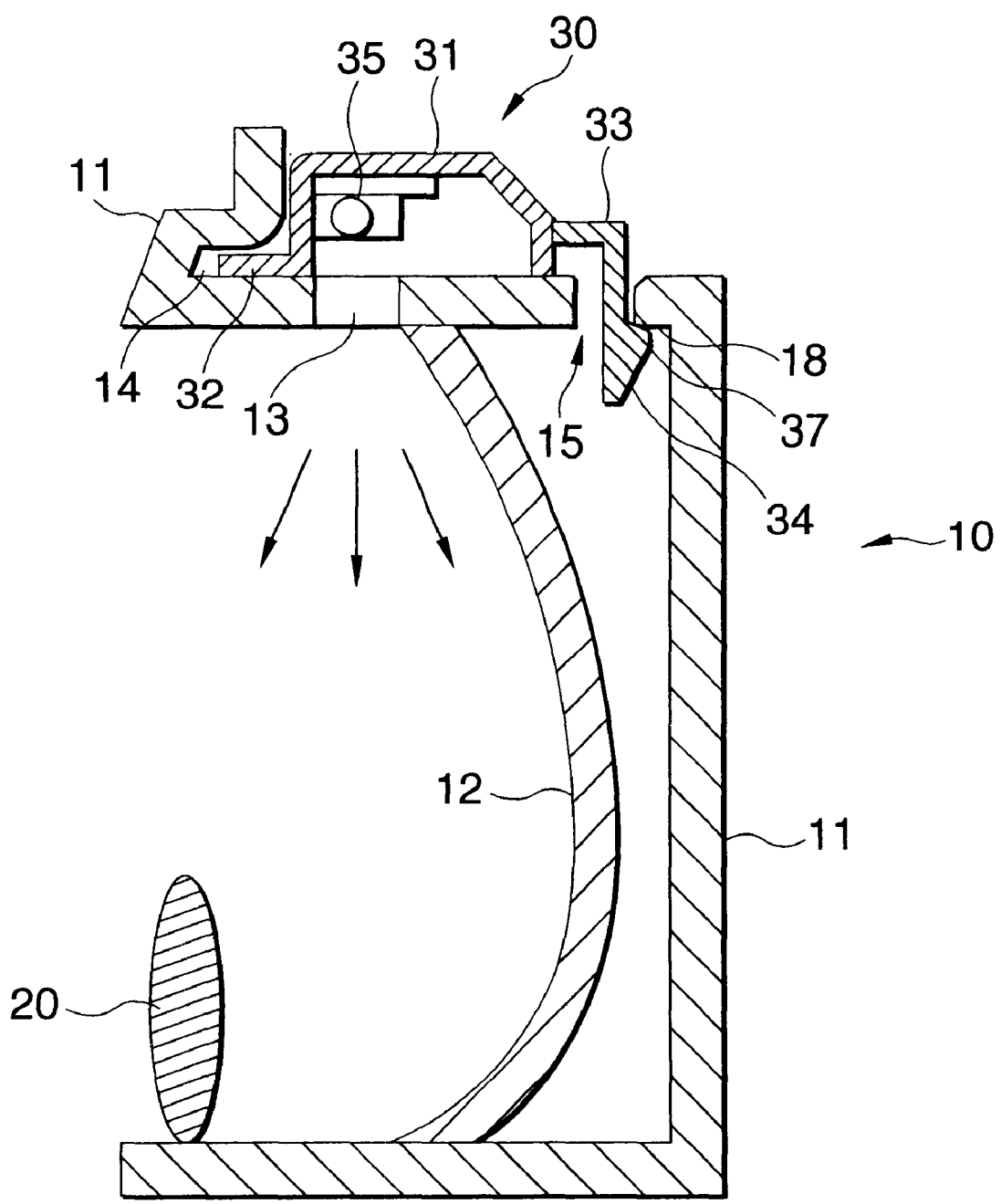
FIG. 4 is a sectional view taken on line A—A in FIG. 1, showing the inside handle portion according to the same embodiment.

FIG. 1 is a front view of a cabin-side inside handle portion 1 having an illuminator according to an embodiment of the present invention. FIG. 2 is a plan view of an inside handle vessel 10. FIG. 3 is a plan view of the inside handle vessel 10 to which a lamp unit 30 has been attached. FIG. 4 is a sectional view of the inside handle portion 1, taken on line A—A.

The configurations of respective members of the inside handle portion 1 will be described below with reference to FIGS. 1 to 4.

The inside handle portion 1 is roughly constituted by the inside handle vessel 10, an inside handle 20, and the lamp unit 30.

The inside handle vessel 10 is constituted by a box-like outer frame 11 and an inner plate 12 so as to form a portion for receiving the inside handle 20. The upper portion of the outer frame 11 is bent backward, and provided with a plug-in portion 14. In addition, plug-in holes 15 constituted by through holes are formed in two places in the top surface of the outer frame 11 as shown in FIG. 2. Further, a window 13 for introducing light from a light source 35 which will be described later is provided in a part of the top surface of the outer frame 11 (see FIG. 4). In this embodiment, in the state where the lamp unit 30 has been attached to the inside vessel 10, through holes are provided in positions opposite to the light source 35, and light guide plates made of light-transmissive resin are fitted in the through holes as to form the windows 13. Light emission surfaces of the light guide plates may be shaped into lenses. Thus, light from the light source can be condensed or diffused to illuminate the inside handle 20. In addition, by use of diffusion prisms, uniform light irradiation can be performed through the windows.

The lamp unit 30 is constituted by a housing 31 and an LED light source 35. The LED light source 35 is provided inside the housing 31. Although an LED is used as a light source in this embodiment, a bulb may be used. The LED 35 is connected to a not-shown power source and a not-shown control circuit so that the lighting state of the LED 35 is controlled.

Feet 32 are provided on one of the side surfaces of the housing 31 while feet 33 are provided on the other side surfaces of the housing 31. The feet 32 and 33 are used for fixing the LED unit 30 to a predetermined position of the inside handle vessel 10. A protrusion 34 is formed on the forward end portion of each of the feet 33. The numbers of the feet 32 and the feet 33 are not limited to those in this embodiment, but each of them is one or more. In addition, the shapes of the feet 32 and 33 are not limited to those in this embodiment.

As shown in FIGS. 3 and 4, the lamp unit 30 is attached to the top surface of the outer frame 11 of the inside handle vessel 10 so that the light source 35 is disposed in opposition to the windows 13 of the inside handle vessel. Light from the light source 35 is introduced into the front side of the inside handle vessel through the windows 13 of the inside handle vessel so as to illuminate the inside handle 20.

Figure 5:
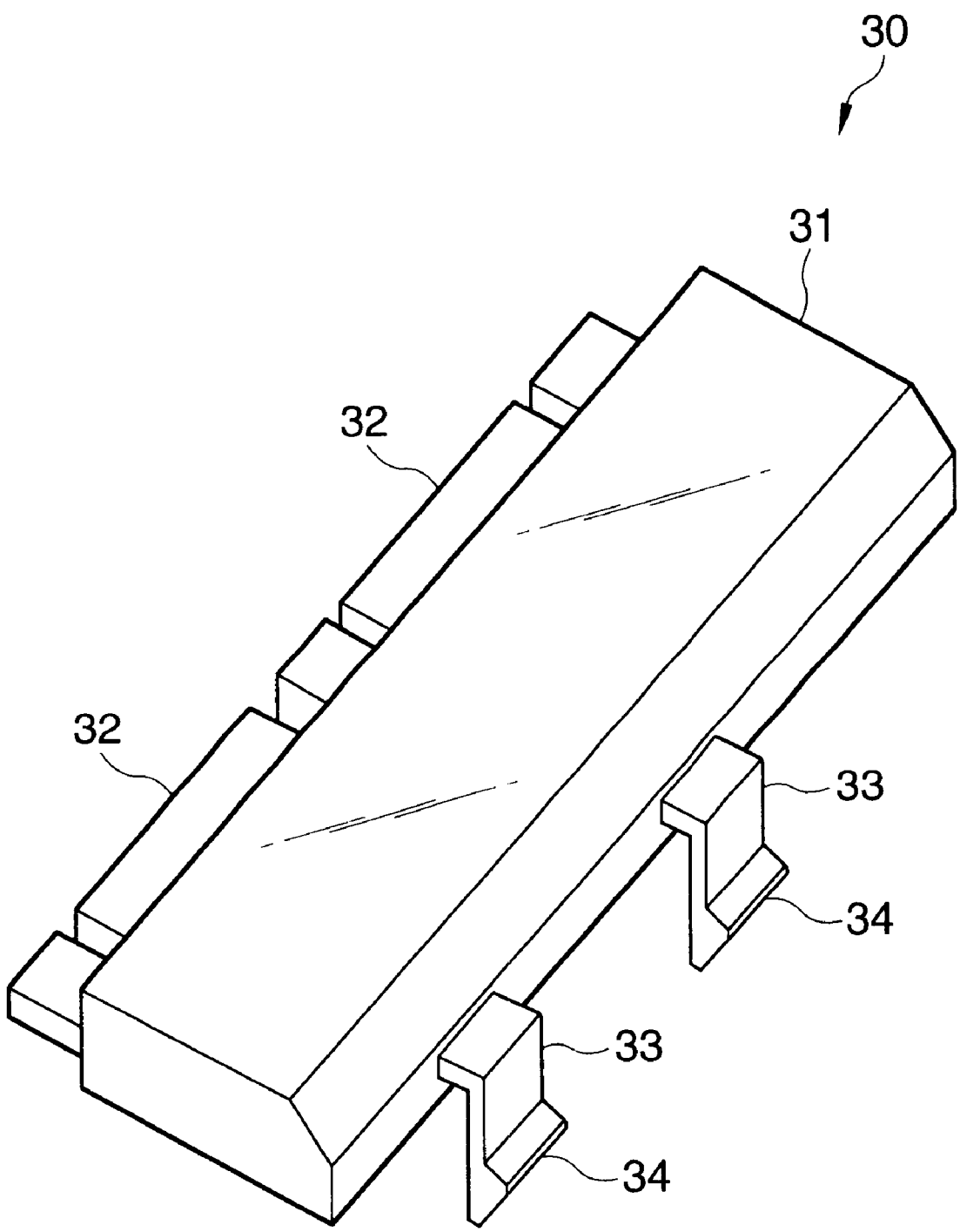
FIG. 5 is a view showing the lamp unit.
Figure 6:
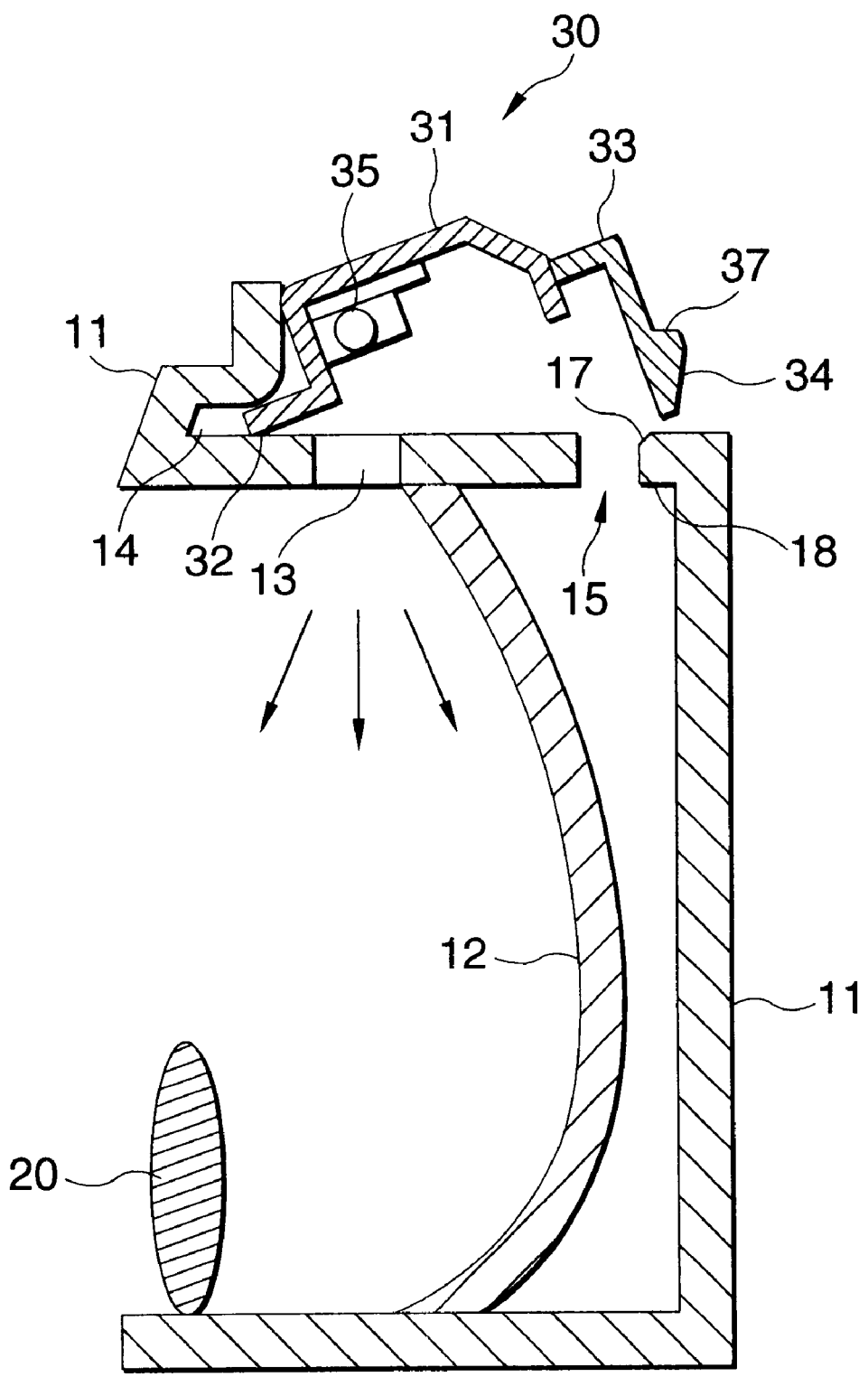
FIG. 6 is a view showing the state where the lamp unit is under attachment to the inside handle vessel.

The method of attaching the lamp unit 30 will be described below with reference to FIGS. 4 to 6. FIG. 6 is a view showing the state where the lamp unit 30 is under attachment.

First, the forward end portions of the feet 32 of the lamp unit 30 are plugged in the plug-in portion 14 of the outer frame 11 of the inside handle vessel 10. At this time, the feet 33 of the lamp unit are located near the plug-in holes 15 of the outer frame 11 of the inside handle vessel (in the state of FIG. 6).

Succeedingly, the feet 32 of the lamp unit 30 are guided to the bottoms of the plug-in portion 14 along the wall surface of the plug-in portion 14. At the same time, the forward end portions 34 of the feet 33 of the lamp unit 30 are guided into the plug-in holes 15. Since the feet 33 of the lamp unit 30 are made of elastic material, the feet 33 are bent slightly while the forward end portions 34 thereof are plugged, downward in FIGS. 4 and 6, in the plug-in holes 15 along wall surfaces 17 of the plug-in holes 15.

When the feet 32 of the lamp unit 30 are completely plugged in the plug-in portion 14, the forward end portions 34 of the feet 33 of the lamp unit 30 are also completely plugged in the through holes 15. In this state, upper portions 37 of the forward end portions 34 of the feet 33 engage with wall surfaces 18 near the entrances of the plug-in holes 15 respectively. Thus, the feet 33 of the lamp unit 30 are locked on the circumferential walls of the plug-in holes 15 so that the lamp unit 30 is fixed to a desirable position of the inside handle vessel 10.

Although the lamp unit 30 was attached to an end portion of the top surface of the inside handle vessel 10 in this embodiment, the position where the lamp unit 30 is attached is not limited to this. The lamp unit 30 may be attached to a desirable position on any side or back surface of the inside handle vessel 10 as well as to a desirable position on the top surface of the inside handle vessel 10.

The work of attaching the inside handle portion 1 to a door trim according to this embodiment is performed as follows. That is, first, there is prepared a module part in which the inside handle vessel 10, the inside handle 20, and so on, are combined with one another. The lamp unit 30 is connected to wiring in a door trim portion. Next, the lamp unit 30 is attached to a predetermined position of the inside handle vessel 10, as described above, before the module part is installed in the door trim. Then, the module part and the lamp unit are installed in the door trim integrally. In such a manner, the lamp unit 30 is attached to the inside handle vessel 10 in advance so that the position of the light source is fixed, before the inside handle vessel 10 is installed in the door trim. That is, it is not necessary to carry out the work of installation while the position of the light source is adjusted. As a result, the workability is improved.

Of course, it is possible to use no module part. In such a case, first, the lamp unit 30 is attached to the inside handle vessel 10, and the inside handle vessel 10 together with the lamp unit 30 is attached to the door trim. Then, other parts are attached thereto.

The present invention is not limited by any of the Detailed Description of the Preferred Embodiments. Various modifications will occur easily to those skilled in the art without departing from the scope of the accompanying claims. Such modifications also belongs to the present invention.

The following items are disclosed.

(10) A method of attaching a lamp unit to an inside handle vessel, the lamp unit being provided with a light source for illuminating an inside handle portion, wherein:
a first engagement portion provided in the back surface of the inside handle vessel is engaged with a second engagement portion provided in the lamp unit so that the lamp unit is fixedly attached to the inside handle vessel.

(11) An attachment method according to the item (10), wherein the light source is constituted by an LED.

(20) A method for adjusting the illumination position of a light source for illuminating an inside handle portion, wherein:

the light source is provided inside a housing having a first engagement portion; and the first engagement portion of the housing is engaged with a second engagement portion provided in the back surface of the inside handle vessel so that the position of the light source is fixed, and the illumination position of the light source is adjusted.

(21) An adjustment method according to the item (20), wherein the light source is constituted by an LED.

What is claimed is:

1. An inside handle illuminator, comprising:

an inside handle vessel;

an inside handle portion;

a lamp unit having a light source for illuminating the inside handle portion of said inside handle vessel from a back surface side of said inside handle vessel; and a fixing device for fixing said lamp unit to said inside handle vessel, wherein said fixing device makes at least one part of said inside handle vessel engage with at least one part of said lamp unit so as to engage said lamp unit to said inside handle vessel.

2. An illuminator according to claim 1, wherein said fixing device comprises one recess or protrusion provided in said inside handle vessel; and another protrusion or recess provided in said lamp unit, and engageable with said recess or protrusion provided in said inside handle vessel.

3. An illuminator according to claim 1, wherein said light source is constituted by an LED.

4. An inside handle illuminator, comprising:

an inside handle vessel having first and second plug-in portions formed in a back surface of said inside handle vessel; and an LED unit including an LED for illuminating an inside handle portion from a back surface side of said inside handle vessel, said LED unit having first and second protrusions;

wherein said first protrusion is plugged in said first plug-in portion, and said second protrusion is plugged in said second plug-in portion, whereby said LED unit is engaged to said inside handle vessel.

5. An inside handle illuminator according to claim 4, wherein:

said first and second plug-in portions are formed as a recess and a through hole respectively;

lock means is provided in a forward end portion of said second protrusion; and when said second protrusion is plugged in said second plug-in portion, said second protrusion is locked on a circumferential wall of said second plug-in portion by said lock means so that said LED unit is engaged to said inside handle vessel.

6. An inside handle illuminator according to claim 4, wherein the first and second protrusions are substantially orthogonal to each other.

7. An inside handle illuminator according to claim 4, wherein the first and second protrusions are flexible.

8. An illumination module, comprising:

a vessel;

a lamp unit having a light source; and a fixing device for fixing said lamp unit to said vessel;

wherein said lamp unit is fixed to said vessel so that said light source illuminates said vessel inside from a back surface side of said vessel, and wherein said fixing device makes at least two parts of said vessel engage with at least two parts of said lamp unit so as to engage said lamp unit to said vessel.

9. An illumination module according to claim 8, wherein said fixing device comprises a recess provided in said vessel; and another protrusion provided in said lamp unit, and engageable with said recess provided in said vessel.

10. An illumination module according to claim 8, wherein said light source is constituted by an LED.

11. An illumination module according to claim 8, wherein one engagement direction between one of said two parts of said vessel and one of said two parts of said lamp unit is substantially orthogonal to another engagement direction between another part of said vessel and another part of said lamp unit.

* * * * *